United States Patent
Kuriyama et al.

(10) Patent No.: US 11,163,038 B2
(45) Date of Patent: Nov. 2, 2021

(54) ANTENNA, SENSOR, AND IN-VEHICLE SYSTEM

(71) Applicant: HITACHI AUTOMOTIVE SYSTEMS, LTD., Ibaraki (JP)

(72) Inventors: Akira Kuriyama, Tokyo (JP); Hideyuki Nagaishi, Tokyo (JP); Akira Kitayama, Hitachinaka (JP); Hiroshi Kuroda, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 173 days.

(21) Appl. No.: 16/303,958

(22) PCT Filed: Feb. 17, 2017

(86) PCT No.: PCT/JP2017/005962
§ 371 (c)(1),
(2) Date: Nov. 21, 2018

(87) PCT Pub. No.: WO2017/203762
PCT Pub. Date: Nov. 30, 2017

(65) Prior Publication Data
US 2020/0319293 A1     Oct. 8, 2020

(30) Foreign Application Priority Data

May 25, 2016   (JP) .............................. JP2016-103958

(51) Int. Cl.
*G01S 7/03*        (2006.01)
*G01S 13/931*      (2020.01)
(Continued)

(52) U.S. Cl.
CPC ............ *G01S 7/032* (2013.01); *G01S 13/931* (2013.01); *H01Q 19/08* (2013.01); *H01Q 1/3233* (2013.01)

(58) Field of Classification Search
CPC ............ H01Q 3/34; H01Q 3/36; H01Q 15/02; H01Q 15/04; H01Q 19/06; H01Q 19/08;
(Continued)

(56) References Cited

U.S. PATENT DOCUMENTS 3,935,577 A  *  1/1976  Hansen ................... H01Q 19/08
                                                  343/781 R
4,187,507 A  *  2/1980  Crane ................... H01Q 19/062
                                                  342/376
(Continued)

FOREIGN PATENT DOCUMENTS

CN          204067583 U   * 12/2014
DE       102006059573 B3    3/2008
(Continued)

OTHER PUBLICATIONS

Extended European Search Report dated Dec. 17, 2019 for the European Patent Application No. 17802364.4.
(Continued)

*Primary Examiner* — Erin F Heard
*Assistant Examiner* — Michael W Justice
(74) *Attorney, Agent, or Firm* — Volpe Koenig

(57) ABSTRACT

Provided is an antenna which includes a plurality of radiating portions which are formed on a substrate and a plurality of dielectric lenses for respectively converting a spherical wave radiated from each radiating portion into a plane wave, wherein the shape of a cross section of each dielectric lens perpendicular to a radiation direction of a beam is formed in a shape which radiates a beam which is narrower in a second direction than in a first direction orthogonal to the second direction, and the plurality of dielectric lenses are arranged side by side in the second direction so that beams radiated from the respective dielectric lenses are synthesized.

11 Claims, 15 Drawing Sheets

(51) Int. Cl.
*H01Q 19/08* (2006.01)
*H01Q 1/32* (2006.01)

(58) Field of Classification Search
CPC ............. H01Q 21/0031; H01Q 25/008; H01Q 1/3233; G01S 7/032; G01S 13/931
USPC ...................................................... 342/11, 70
See application file for complete search history.

(56) References Cited

U.S. PATENT DOCUMENTS

| | | | | |
|---|---|---|---|---|
| 4,788,553 | A * | 11/1988 | Phillips | G01S 13/60 343/753 |
| 5,905,457 | A * | 5/1999 | Rashid | G01S 13/931 342/70 |
| 5,933,109 | A * | 8/1999 | Tohya | H01Q 25/00 342/175 |
| 6,043,772 | A | 3/2000 | Voigtlaender et al. | |
| 6,137,434 | A * | 10/2000 | Tohya | H01Q 1/3233 342/70 |
| 7,705,771 | B2 * | 4/2010 | Kato | G01S 7/4026 342/70 |
| 7,710,312 | B2 * | 5/2010 | Kato | G01S 7/034 342/70 |
| 7,733,265 | B2 * | 6/2010 | Margomenos | G01S 7/032 342/70 |
| 8,432,309 | B2 * | 4/2013 | MacDonald | G01S 13/931 342/137 |
| 2007/0241962 | A1 * | 10/2007 | Shinoda | G01S 7/2813 342/361 |
| 2008/0278393 | A1 | 11/2008 | Gottwald et al. | |
| 2009/0021436 | A1 * | 1/2009 | Clymer | H01P 1/161 343/713 |
| 2009/0140911 | A1 * | 6/2009 | Kato | H01Q 3/40 342/70 |
| 2009/0140912 | A1 * | 6/2009 | Kato | G01S 7/4026 342/70 |
| 2009/0251362 | A1 * | 10/2009 | Margomenos | G01S 13/931 342/175 |
| 2010/0231436 | A1 | 9/2010 | Focke et al. | |
| 2011/0234466 | A1 | 9/2011 | Yamada | |
| 2012/0050094 | A1 | 3/2012 | Nakabayashi et al. | |
| 2012/0133547 | A1 * | 5/2012 | MacDonald | G01S 13/931 342/70 |
| 2012/0256784 | A1 | 10/2012 | Nakabayashi et al. | |
| 2013/0194127 | A1 | 8/2013 | Ishihara et al. | |

FOREIGN PATENT DOCUMENTS

| | | | |
|---|---|---|---|
| DE | 102007036262 | A1 | 2/2009 |
| DE | 102012106938 | A1 | 1/2014 |
| GB | 654944 | * | 4/1946 |
| JP | S56-069903 | A | 6/1981 |
| JP | 7-110375 | A | 4/1995 |
| JP | 10-160838 | A | 6/1998 |
| JP | 2000-228608 | A | 8/2000 |
| JP | 2004-112700 | A | 4/2004 |
| JP | 2012-21893 | A | 2/2012 |
| JP | 2012-052928 | A | 3/2012 |
| JP | 2012-175680 | A | 9/2012 |
| JP | 2012-222507 | A | 11/2012 |
| JP | 2013-156794 | A | 8/2013 |
| WO | 2014/019778 | A1 | 2/2014 |

OTHER PUBLICATIONS

International Search Report for WO 2017/203762 A1, dated Mar. 21, 2017.

* cited by examiner

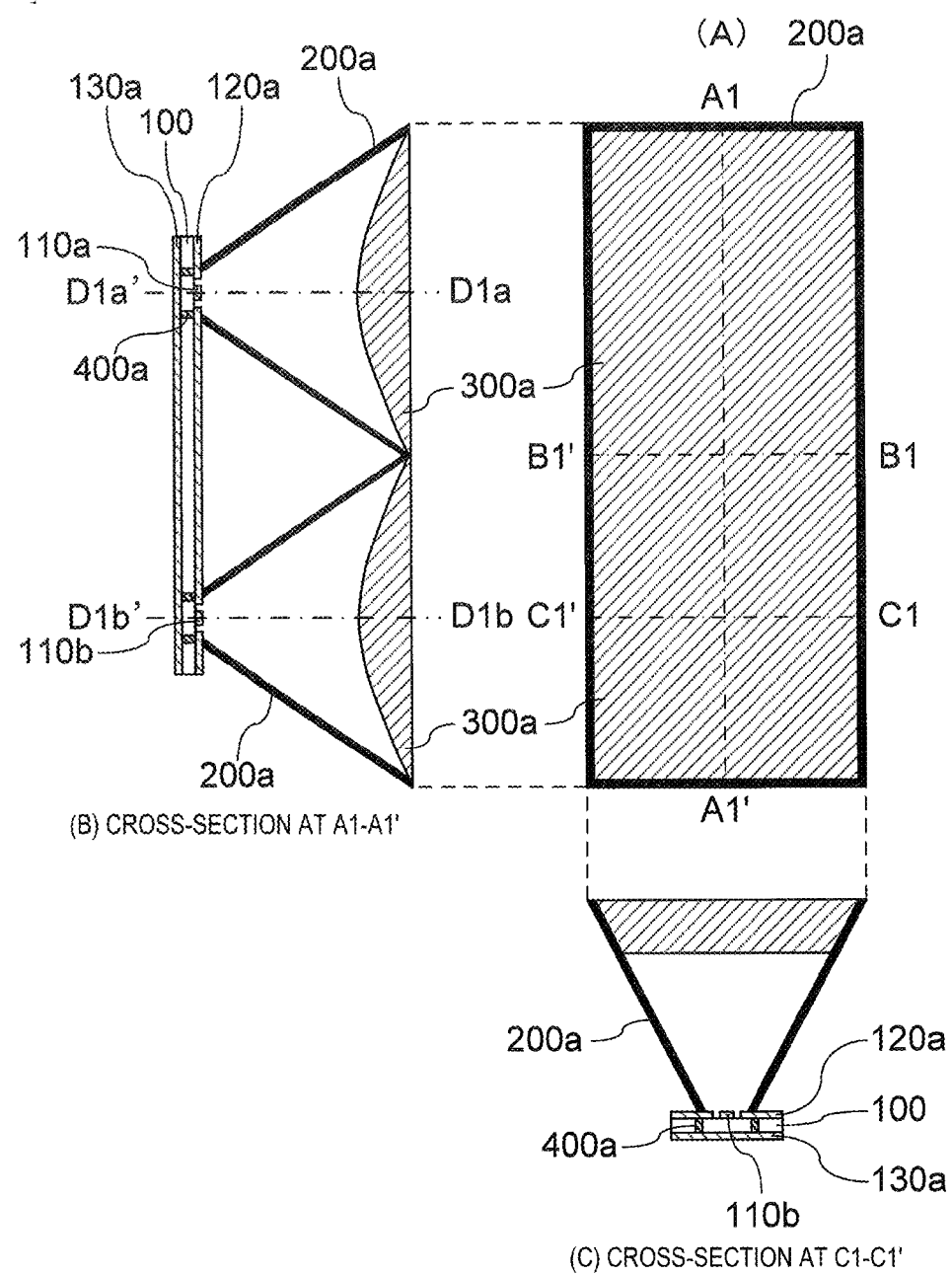

[FIG. 2A]
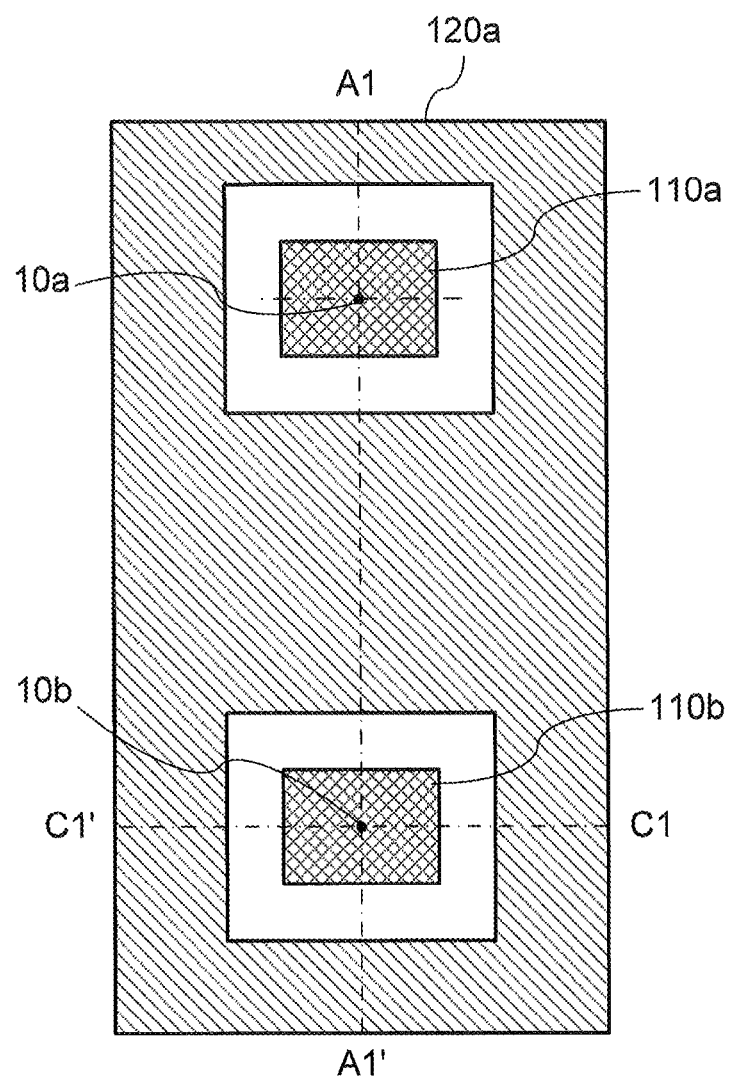

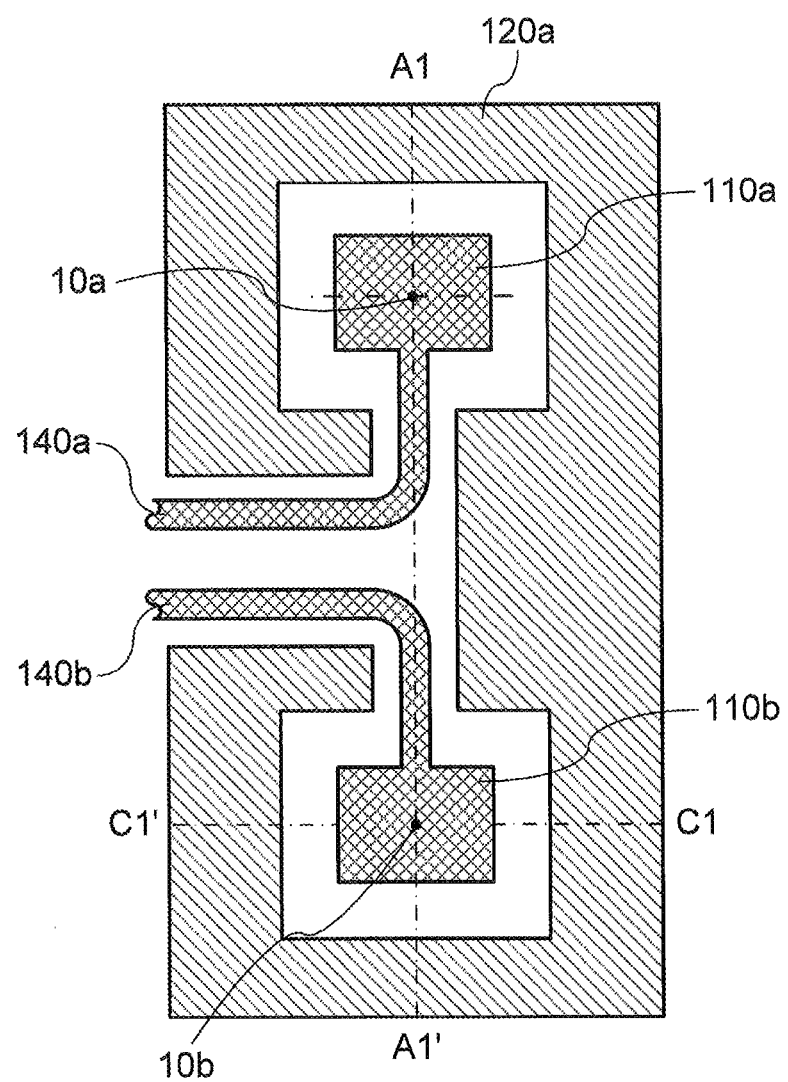
[FIG. 2B]

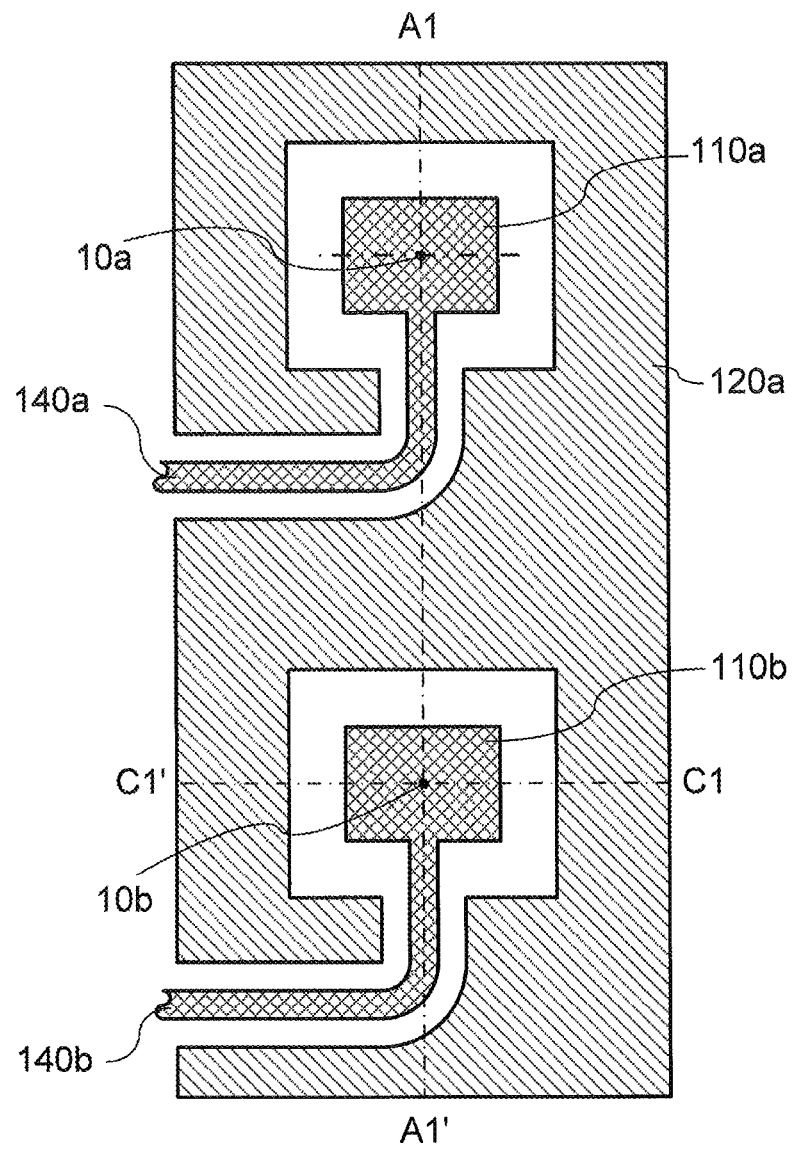
[FIG. 2C]

[FIG. 3A]
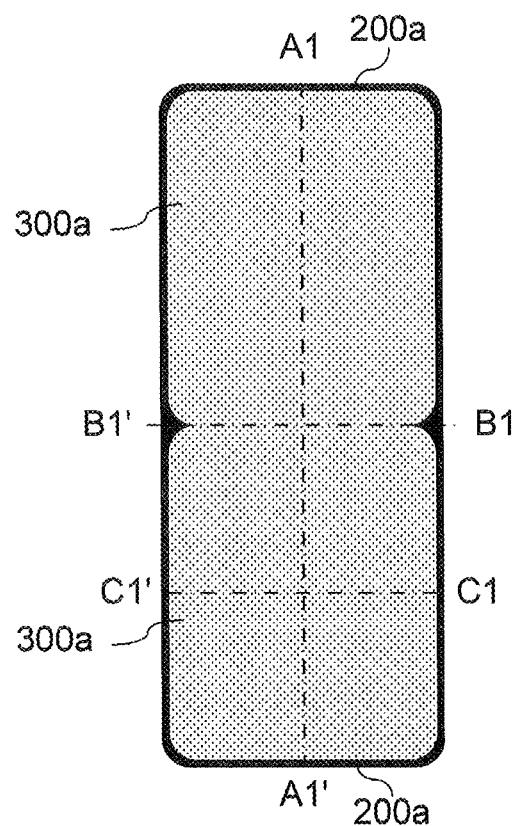
[FIG. 3B]
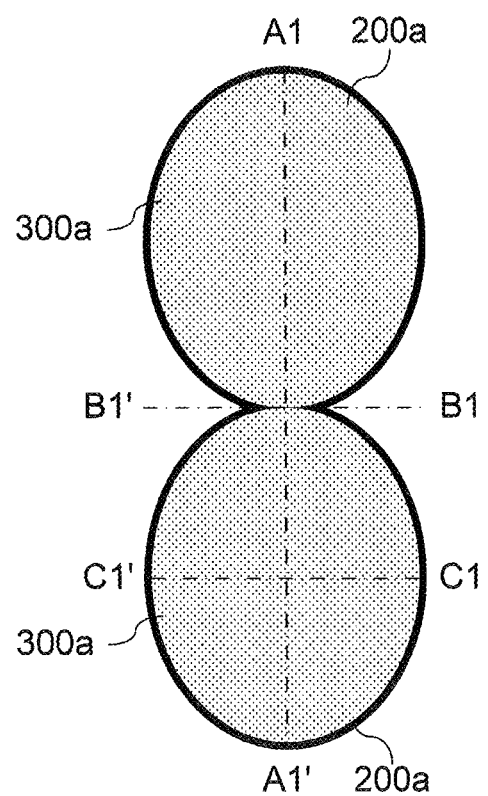

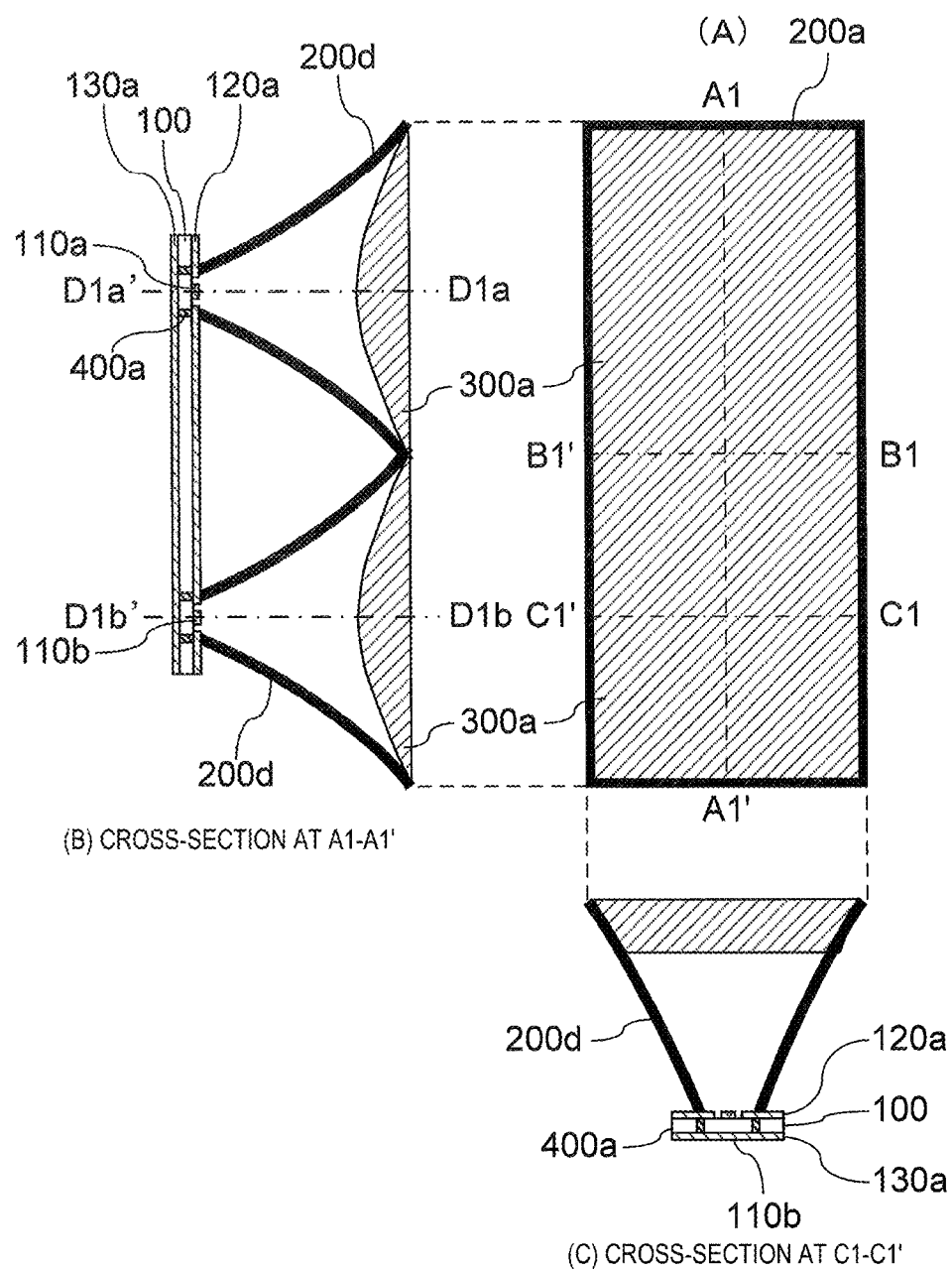

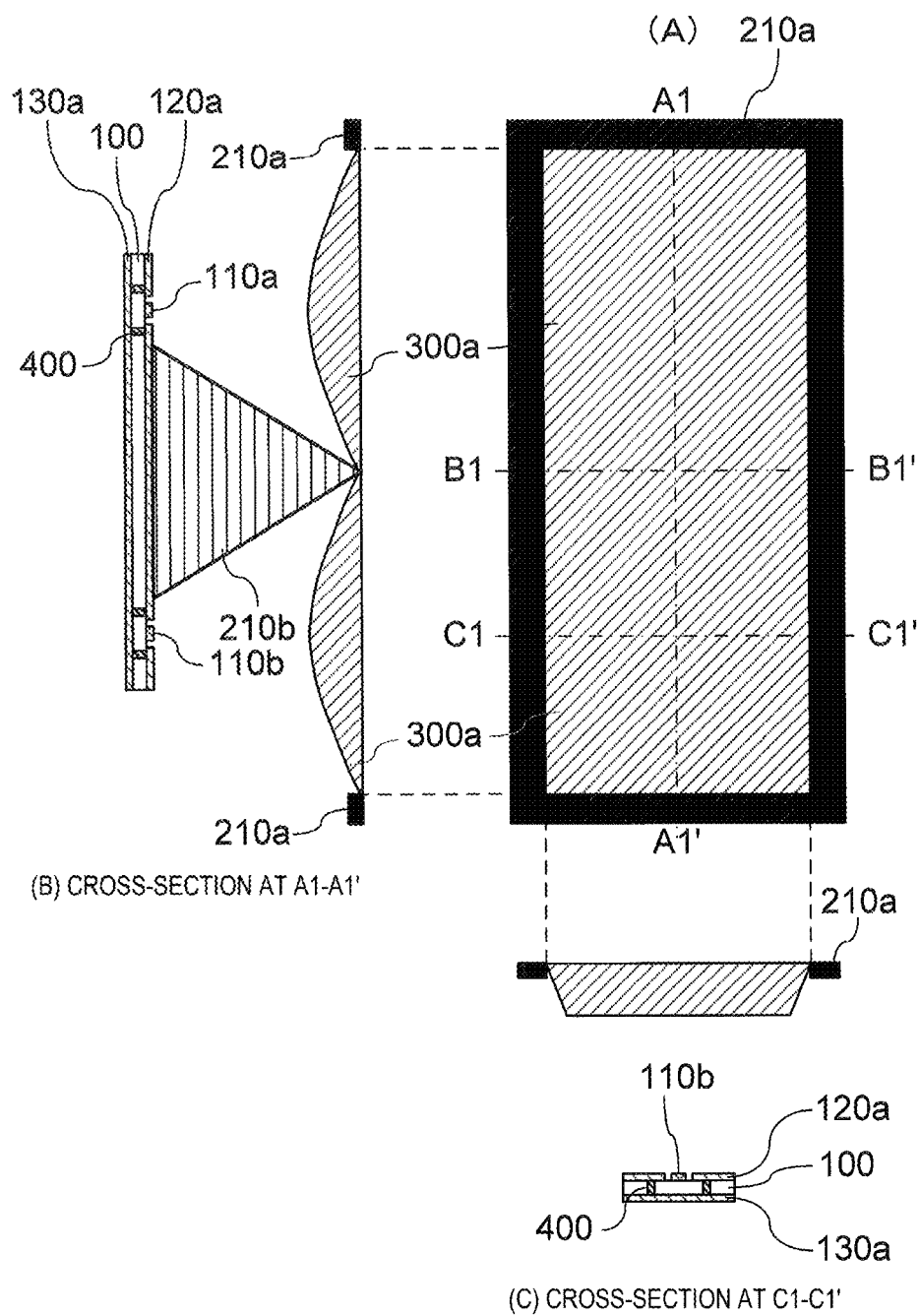

[FIG. 6]
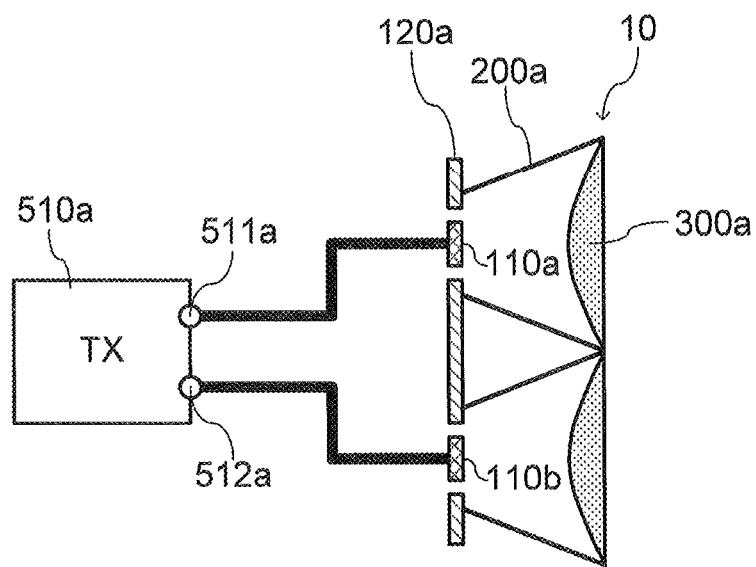
[FIG. 7]
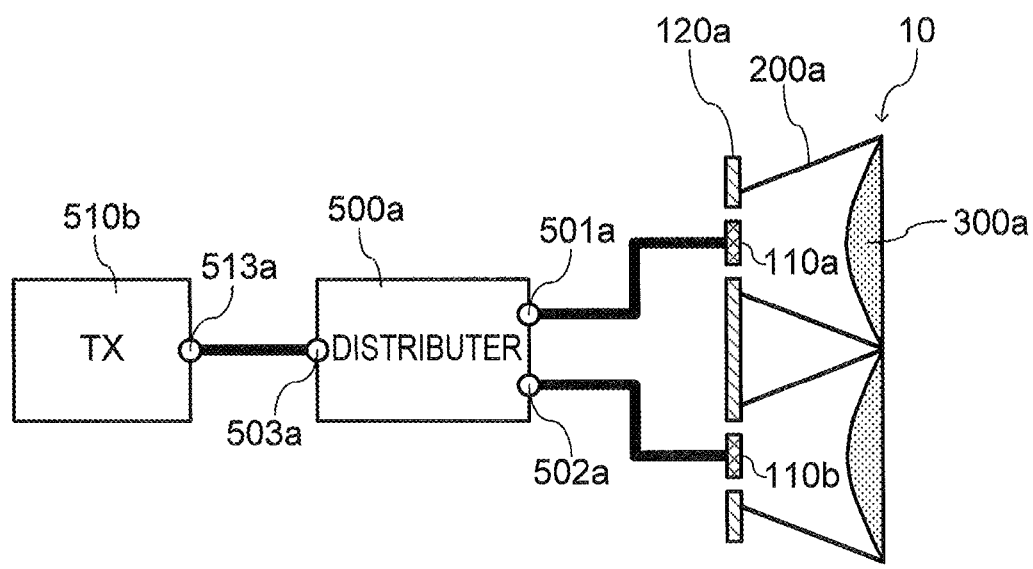

[FIG. 8]
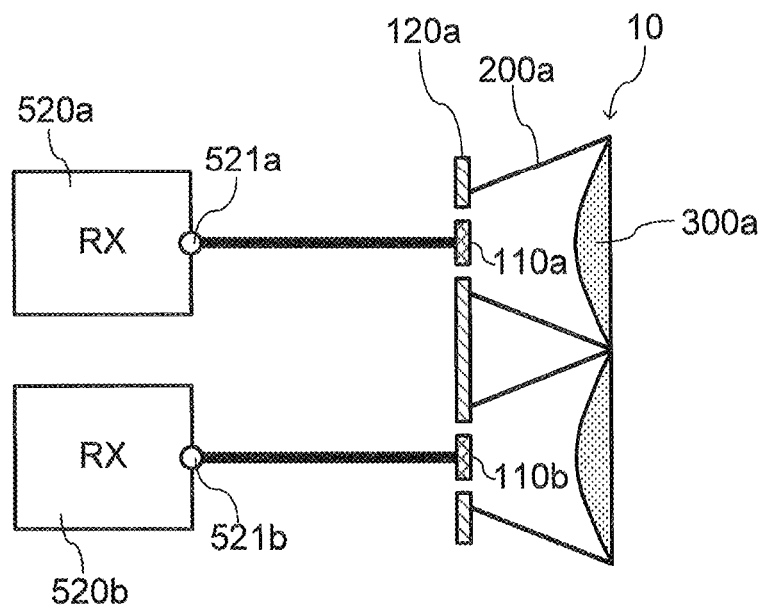
[FIG. 9]
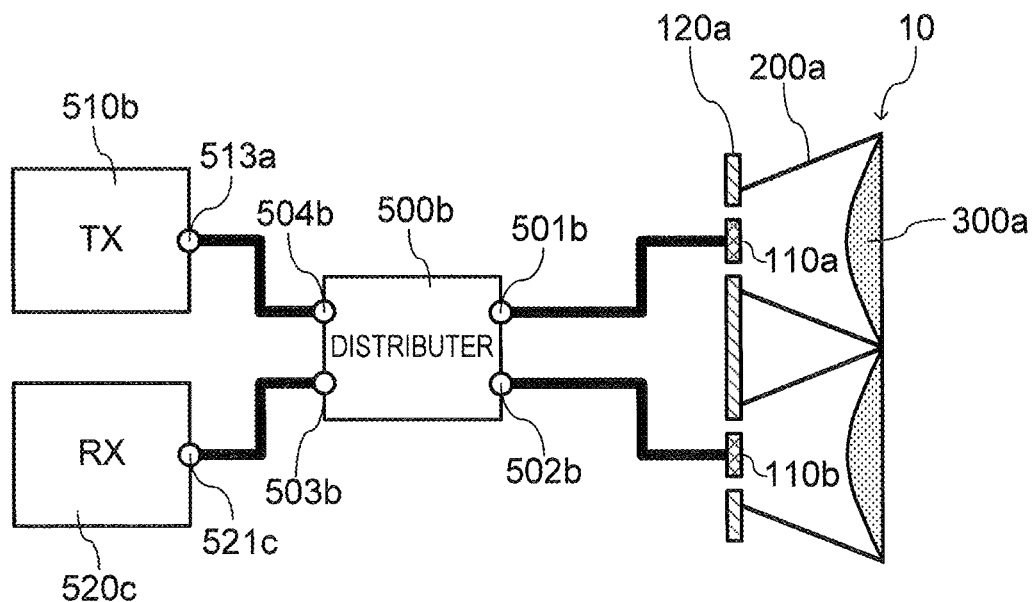

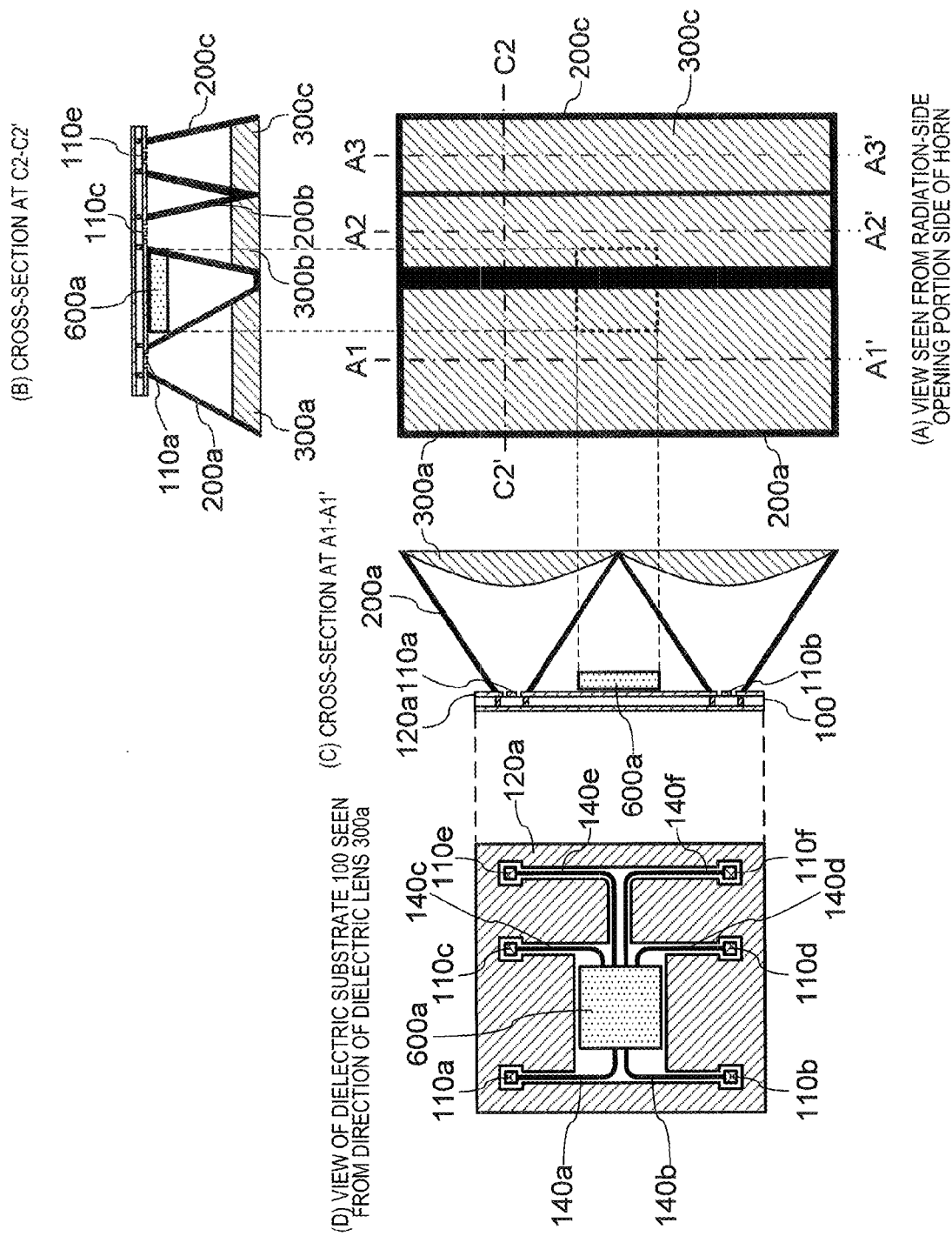
[FIG. 10]

[FIG. 11A]
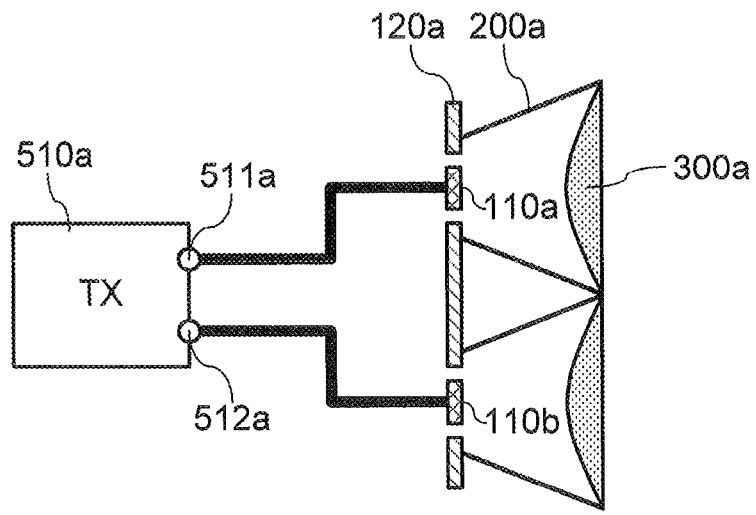
[FIG. 11B]
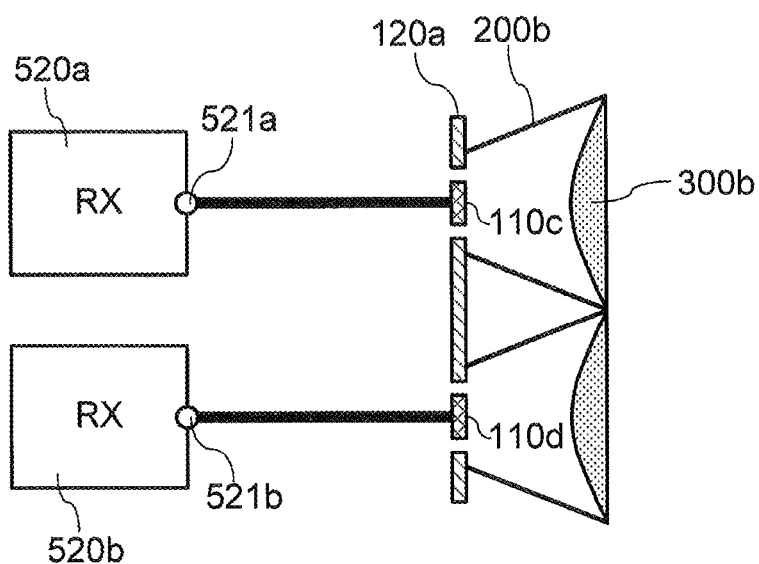
[FIG. 11C]
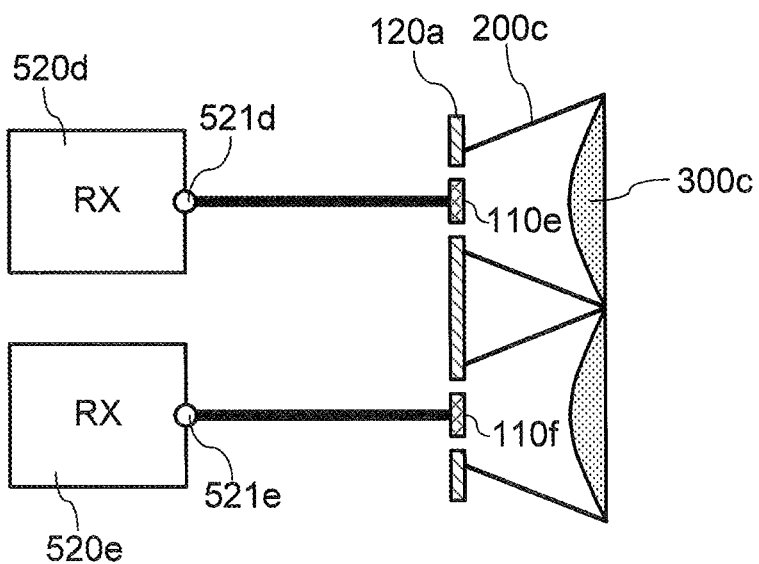

[FIG. 12]
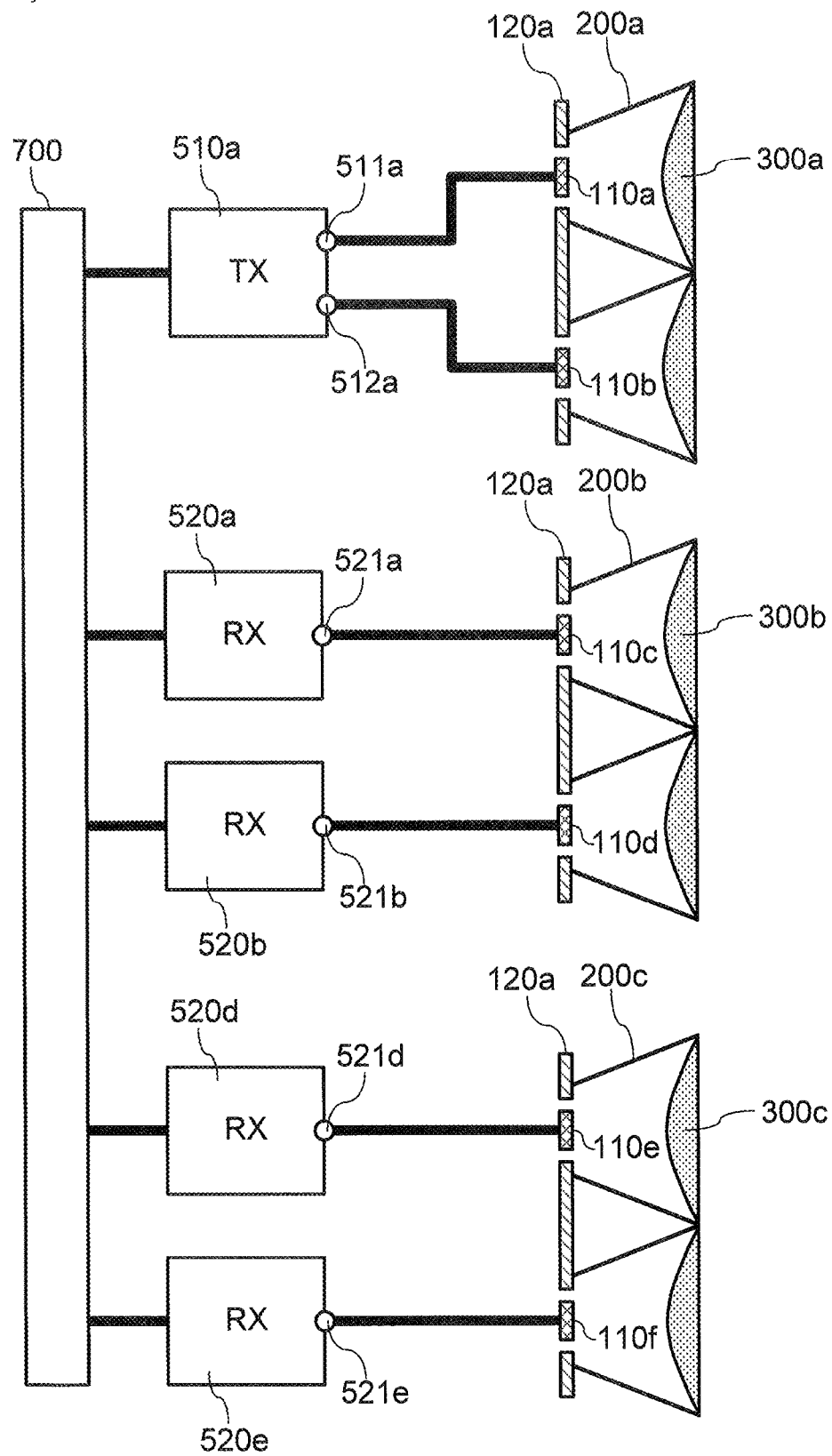

[FIG. 13]
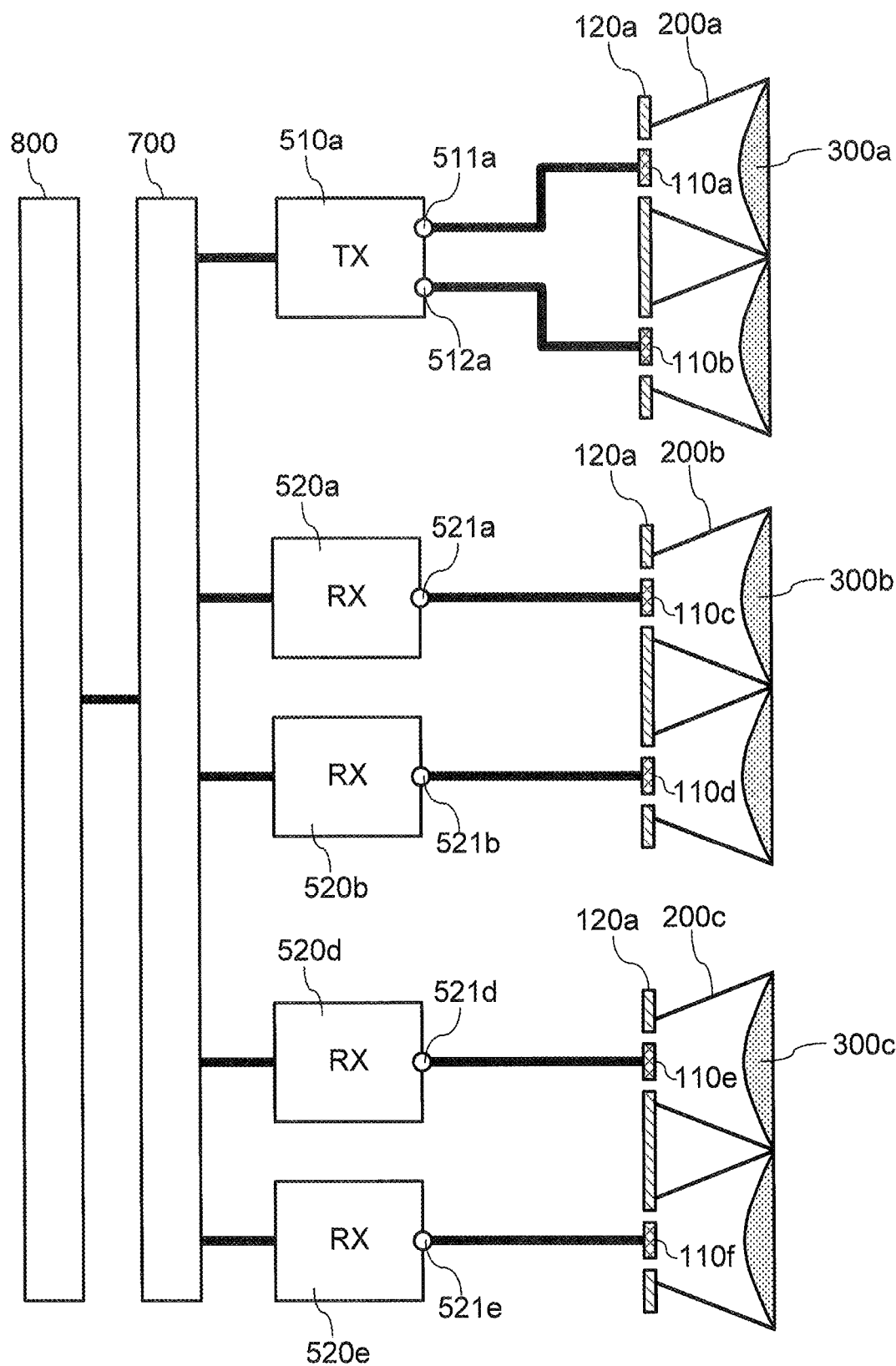

[FIG. 14]
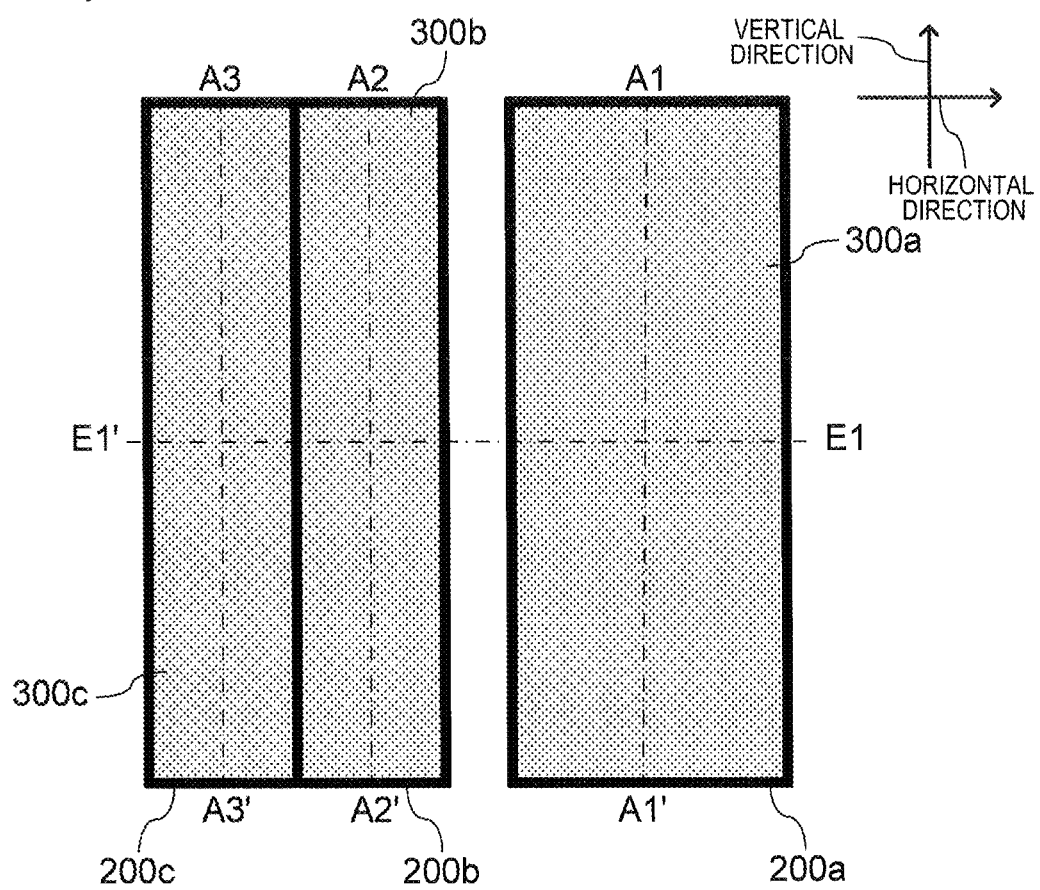

[FIG. 15]
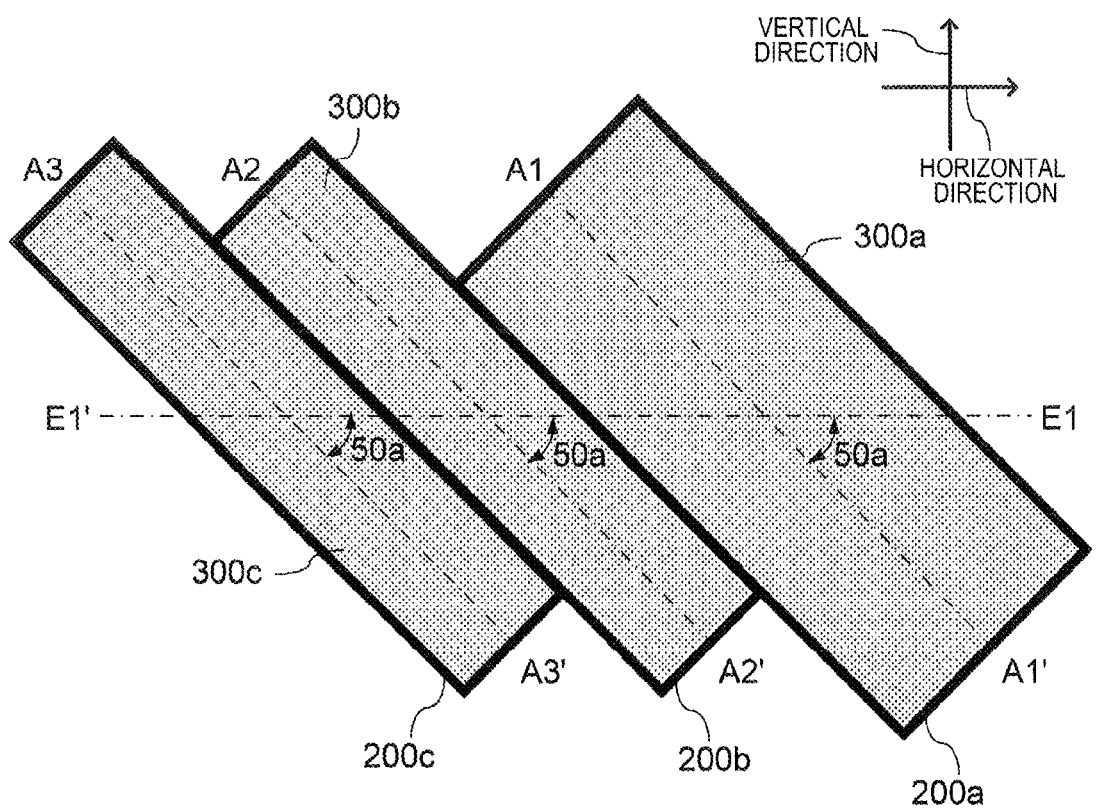

ANTENNA, SENSOR, AND IN-VEHICLE SYSTEM

CROSS-REFERENCE TO RELATED APPLICATIONS

This application is based upon and claims the benefit of priority from Japanese Patent Application No. 2016-103958, filed May 25, 2016, the entire contents of which are incorporated herein reference.

TECHNICAL FIELD

The present invention relates to an antenna for generating a flat beam.

BACKGROUND ART

There are Doppler sensors or radars using radio waves as surrounding situation detection sensors for safe navigation and safe operation of automobiles, railways, infrastructure equipment and the likes. For the sake of simplifying below description, a Doppler sensor for automobiles will be described.

For automobiles, a plurality of sensors covering all areas around the automobile, such as forward long distance, forward middle distance, forward short distance, sideward, rearward middle distance, and the like, are used for safe driving support and automatic driving. For this reason, it is possible to detect various target objects such as forward obstacles, preceding vehicles, rear vehicles, people, and the likes, according to a driving scene.

As background arts of the technology, there are JP-A-2012-52928 (PTL 1), JP-A-2012-222507 (PTL 2), JP-A-2000-228608 (PTL 3), and JP-A-1998-160838 (PTL 4).

JP-A-2012-52928 (PTL 1) discloses an antenna which generates a flat beam by setting a parallel number of antenna elements such that different numbers are set between a direction connected to a feed line and a direction not connected. JP-A-2012-222507 (PTL 2) discloses an antenna for generating the flat beam by setting the parallel number of transmitting-side unit antennas and receiving-side unit antennas such that different numbers are set between a horizontal direction and a vertical direction.

However, with the antennas disclosed in JP-A-2012-52928 (PTL 1) and JP-A-2012-222507 (PTL 2), there is a problem in that the feed line for supplying electric power to the antenna element or the unit antenna becomes long, and thus an antenna gain decreases due to loss of the feed line.

JP-A-2000-228608 (PTL 3) discloses an antenna which is constituted of a primary radiator constituted of a dielectric lens, a patch antenna, and a metallic horn and in which the primary radiator is disposed at a focal position of the dielectric lens. JP-A-1998-160838 (PTL 4) discloses an antenna which converges electromagnetic waves radiated from a power supply portion with the dielectric lens. In the antennas disclosed in JP-A-2000-228608 (PTL 3) and JP-A-1998-160838 (PTL 4), electromagnetic waves are collected by the dielectric lens or the horn to improve the antenna gain.

SUMMARY OF INVENTION

Technical Problem

In such a sensor, a beam shape of an electromagnetic wave transmitted or received from an antenna needs to be a flat shape which is wide in a horizontal direction and narrow in a vertical direction. The reason for this is that it is desirable to widen a viewing angle with respect to a target object in the horizontal direction, and noise (load clutter noise) due to unnecessary radiation from the ground is reduced in the vertical direction, in such a manner that the detection sensitivity of the received signal is increased and thus distant obstacles are detected.

When the structure disclosed in JP-A-2000-228608 (PTL 3) is adopted in order to reduce the loss due to the feed line as in JP-A-2012-52928 (PTL 1) and JP-A-2012-222507 (PTL 2), the primary radiator is disposed at a position separated from the dielectric lens by the focal length, and the focal length is sufficiently longer than the wavelength of the electromagnetic wave. Therefore, the electromagnetic waves radiated from the primary radiator are distributed on a substantially circular shape on an opening surface of the dielectric lens, and the electromagnetic waves radiated from the dielectric lens have a substantially isotropic beam shape. Thus, there is a problem in that a flat beam cannot be generated.

In the antennas disclosed in JP-A-2000-228608 (PTL 3) and JP-A-1998-160838 (PTL 4), electromagnetic waves radiated from the primary radiator and the power supply portion are collected by one dielectric lens. Therefore, there is a problem in that the focal length of the dielectric lens becomes long and the size of the antenna becomes large.

For this reason, a compact antenna for generating a flat beam is required.

Solution to Problem

A representative example of the invention disclosed in the application is as follows. That is, there is provided an antenna which includes a plurality of radiating portions which are formed on a substrate and a plurality of dielectric lenses for respectively converting a spherical wave radiated from each radiating portion into a plane wave, wherein the shape of a cross section of each dielectric lens perpendicular to a radiation direction of a beam is formed in a shape which radiates a beam which is narrower in a second direction than in a first direction orthogonal to the second direction and the plurality of dielectric lenses are arranged side by side in the second direction so that beams radiated from the respective dielectric lenses are synthesized.

Advantageous Effects of Invention

According to an aspect of the invention, it is possible to reduce the size of an antenna for generating a flat beam. Problems, configurations, and effects other than those described above will be clarified by the description of the following examples.

BRIEF DESCRIPTION OF DRAWINGS

FIG. 1 is a structural diagram of a flat beam generating antenna according to an example of the invention.

FIG. 2A is a structural diagram of a flat beam generating antenna according to an example of the invention.

FIG. 2B is a structural diagram of a flat beam generating antenna according to an example of the invention.

FIG. 2C is a structural diagram of a flat beam generating antenna according to an example of the invention.

FIG. 3A is a structural diagram of a flat beam generating antenna according to an example of the invention.

FIG. 3B is a structural diagram of a flat beam generating antenna according to an example of the invention.

FIG. 4 is a structural diagram of a flat beam generating antenna according to an example of the invention.

FIG. 5 is a structural diagram of a flat beam generating antenna according to an example of the invention.

FIG. 6 is a block diagram of a transmitting side of a sensor including a flat beam generating antenna according to an example of the invention.

FIG. 7 is a block diagram of a transmitting side of a sensor including a flat beam generating antenna according to an example of the invention.

FIG. 8 is a block diagram of a receiving side of a sensor including a flat beam generating antenna according to an example of the invention.

FIG. 9 is a block diagram of a sensor including a flat beam generating antenna according to an example of the invention.

FIG. 10 is a structural diagram of a sensor including a flat beam generating antenna according to an example of the invention.

FIG. 11A is a block diagram of a sensor including a flat beam generating antenna according to an example of the invention.

FIG. 11B is a block diagram of a sensor including a flat beam generating antenna according to an example of the invention.

FIG. 11C is a block diagram of a sensor including a flat beam generating antenna according to an example of the invention.

FIG. 12 is a block diagram of a sensor including a flat beam generating antenna according to an example of the invention.

FIG. 13 is a block diagram of an in-vehicle system including a sensor including a flat beam generating antenna according to an example of the invention.

FIG. 14 is a view illustrating an attachment angle of a flat beam generating array antenna according to an example of the invention.

FIG. 15 is a view illustrating an attachment angle of the flat beam generating array antenna according to an example of the invention.

DESCRIPTION OF EMBODIMENTS

Hereinafter, the best mode for carrying out the invention will be described in detail with reference to drawings. In the drawings for explaining the best mode for carrying out the invention, the same reference numerals and characters are given to members having the same function and the repetitive description thereof will be omitted.

Example 1

FIGS. 1 and 2A are structural diagrams of a flat beam generating array antenna according to an example of the invention.

In the antenna illustrated in FIGS. 1 and 2A, a first radiating portion 110a and a second radiating portion 110b are formed on a first surface of a dielectric substrate 100. A first conductor portion 120a is formed on the first surface of the dielectric substrate 100 and a second conductor portion 130a is formed on a second surface opposite to the first surface of the dielectric substrate 100. In addition, a through hole 400a is formed for electrically connecting the conductor on the first surface of the dielectric substrate 100 and the conductor on the second surface. First horns 200a, at least inner surfaces of which are formed of the conductor, is attached on the first face side of the dielectric substrate 100, and a first dielectric lens 300a is disposed in the vicinity of a radiation-side opening portion of each first horn 200a. With such a configuration, the antenna of Example 1 radiates radio waves substantially in parallel with a first optical axis D1a-D1a' and a second optical axis D1b-D1b' of the first dielectric lenses 300a.

A first imaginary line (longitudinal center line) A1-A1' is a line passing through centers of the radiation-side opening portions of the first horns 200a in the shortest length. A second imaginary line (transverse center line) B1-B1' is a line passing through the center of the first imaginary line A1-A1' and perpendicular to the first imaginary line A1-A1'.

In the antenna of the example, one half of the first imaginary line A1-A1' (that is, the length of one radiation-side opening portion in the A1-A1' direction) is longer than the second imaginary line B1-B1'. That is, in the example, the radiation-side opening portion of the first horn 200a has a rectangular shape in which a direction (longitudinal direction) of the first imaginary line A1-A1' is longer than a direction of the second imaginary line B1-B1' (transverse direction).

A third imaginary line C1-C1' is a line passing through the intersection of the first imaginary line A1-A1' and the second optical axis D1b-D1b' and perpendicular to the first imaginary line A1-A1'.

(A) of FIG. 1 illustrates a shape of the antenna of the example as seen from a radiation-side opening portion side of the first horn 200a. (B) of FIG. 1 illustrates a cross-sectional shape of the antenna of the example along the first imaginary line A1-A1'. (C) of FIG. 1 illustrates a cross-sectional shape of the antenna of the example along the third imaginary line C1-C1'.

FIG. 2A illustrates a shape of the dielectric substrate 100 as seen from a first surface side.

On the first surface of the dielectric substrate 100, the first conductor portion 120a is formed to surround the first radiating portion 110a and the second radiating portion 110b leaving a certain distance from the first radiating portion 110a and the second radiating portion 110b. The first conductor portion 120a is electrically connected to the second conductor portion 130a formed on the second surface of the dielectric substrate 100 via the through hole 400a. As a result, the first conductor portion 120a and the second conductor portion 130a function as reference potential planes of the first radiating portion 110a and the second radiating portion 110b and each of the first radiating portion 110a and the second radiating portion 110b operates as a patch antenna, and thus an electromagnetic wave is radiated from the first surface side of the dielectric substrate 100.

Furthermore, radiation-source-side opening portions which are positioned on a side opposite to the radiation-side opening portions of the first horns 200a in a radio wave travelling direction are disposed on the first surface side of the dielectric substrate 100 so as to involve the first radiating portion 110a and the second radiating portion 110b respectively. That is, the first horns 200a have two left-right symmetric horn shapes symmetrical with the second imaginary line B1-B1' as an axis.

As described above, the antenna of the example is constituted of the first radiating portion 110a, the second radiating portion 110b, and two first horns 200a.

It is preferable that the interval at which the through holes 400a are arranged be set to be shorter than the length of a quarter of the wavelength of an electromagnetic wave to be used within the dielectric substrate 100.

Further, the potential of the first horn 200a can be made equal to the reference potential of the first radiating portion 110a and the second radiating portion 110b by electrically connecting the first horn 200a to the first conductor portion 120a, and thus the electromagnetic waves radiated from the first radiating portion 110a and the second radiating portion 110b can be efficiently transmitted to the first horns 200a.

Furthermore, the first dielectric lens 300a having a convex shape in the direction of the radiation-source-side opening portion is arranged in the radiation-side opening portion of the first horn 200a, in such a manner that the length of the first horn 200a from the radiation-source-side opening portion to the radiation-side opening portion can be shortened, and thus the size of the antenna can be reduced. Further, first dielectric lenses are formed in consecutive convex shapes in the direction of the first imaginary line A1-A1', the number of the consecutive convex shape and the number of the radiating portions 110a and 110b being the same. That is, two first dielectric lenses 300a of the antenna of the example are consecutively arranged in the direction of the first imaginary line A1-A1' and has a left-right symmetric convex shape with respect to the second imaginary line B1-B1' as an axis. Further, the first radiating portion 110a and the second radiating portion 110b are arranged at positions approximately corresponding to the focal position of the first dielectric lens 300a. The diameter of the convex shape constituting the first dielectric lens 300a is longer than the dimension of the first horn 200a in a direction along the third imaginary line C1-C1' in the plane of the radiation-side opening portion.

According to the structure described above, the diameter of the first dielectric lens 300a is shortened to one-half of that of a case where the first dielectric lens 300a has one convex shape. In this case, the diameter of the dielectric lens and the focal length are substantially proportional to each other in general, and thus the focal length of the first dielectric lens 300a is shortened to approximately one-half. Therefore, the size thereof can be reduced in the electromagnetic wave radiation direction (direction of the first optical axis D1a-D1a' or the second optical axis D1b-D1b').

Further, the first dielectric lens 300a is formed into a cylindrical shape having a hyperbolic shape in the direction of the first imaginary line A1-A1' and a linear shape in the direction of the second imaginary line B1-B1', in such a manner that side lobes in the direction of the first imaginary line A1-A1' and the direction of the second imaginary line B1-B1' of the beam radiated from the first dielectric lens 300a can be reduced.

Further, it is preferable that, in the direction of the first imaginary line A1-A1', the center of the first radiating portion 110a is located at the intersection of the first optical axis D1a-D1a' of the first dielectric lens 300a and the first surface of the dielectric substrate 100, and the center of the second radiating portion 110b is located at the intersection of the second optical axis D1b-D1b' of the first dielectric lens 300a and the first surface of the dielectric substrate 100.

Next, the operation of the antenna of the example will be described. The spherical electromagnetic wave radiated from the first radiating portion 110a propagates in the first horn 200a, is input to the first dielectric lens 300a, and propagates in the first dielectric lens 300a, and then the electromagnetic wave is radiated to the space. During the propagation, the first horn 200a and the first dielectric lens 300a convert the spherical wave into the plane wave. Similarly, a spherical electromagnetic wave radiated from the second radiating portion 110b propagates in the first horn 200a and the electromagnetic wave is converted from the spherical wave to the plane wave by the first horn 200a and the first dielectric lens 300a during the propagation.

Further, the plane electromagnetic wave originated in the first radiating portion 110a and radiated from the first horn 200a, and the plane electromagnetic wave originated in the second radiating portion 110b and radiated from the first horn 200a are synthesized in a space outside the radiation-side opening portion of the first horn 200a and radiated as plane electromagnetic waves.

By such operation, the antenna of the example can radiate a beam having directivity in a desired direction.

Further, the antenna of the example has a structure in which two horns are in a row in the longitudinal direction, and half (the length of the radiation-side opening portion of one horn in the direction of the first imaginary line A1-A1') of the first imaginary line A1-A1' is longer than the second imaginary line B1-B1'. That is, in one dielectric lens 300a (a part of the dielectric lens corresponding to one radiating portion) provided on the radiation side of the antenna, the length in the direction of the first imaginary line A1-A1' is longer than the length in the direction of the second imaginary line B1-B1'. In the antenna of the example, the first imaginary line A1-A1' is arranged in the longitudinal direction and the second imaginary line B1-B1' is arranged in the transverse direction. Therefore, regarding the shape of the beam radiated from the first horn 200a, a flat beam in which the width in the direction (transverse direction) of the second imaginary line B1-B1' is greater than the width in the direction (longitudinal direction) of the first imaginary line A1-A1' is generated.

It is preferable that the electric field plane direction (B plane direction) of electromagnetic waves radiated from the first radiating portion 110a and the second radiating portion 110b be arranged in parallel to the first imaginary line A1-A1', in such a manner that the shape of the beam radiated from the first horn 200a is likely to be narrowed in the first imaginary line A1-A1' direction.

Example 2

FIGS. 2B and 2C are structural diagrams of a flat beam generating array antenna according to an example of the invention and illustrate shapes as viewed from the first surface side of the dielectric substrate 100. Variations of a feed line are illustrated in the second example.

In the antenna illustrated in FIGS. 2B and 2C, the first radiating portion 110a is connected to a first feed line 140a and the second radiating portion 110b is connected to the second feed line 140b. The first conductor portion 120a is formed to surround the first radiating portion 110a and the second radiating portion 110b leaving a certain distance from the first radiating portion 110a and the second radiating portion 110b. Also, the first conductor portion 120a is formed leaving a certain distance from the first feed line 140a and the second feed line 140b.

With such a configuration, energy for electromagnetic waves to be radiated is supplied to the first radiating portion 110a via the first feed line 140a. Similarly, energy for electromagnetic waves to be radiated is supplied to the second radiating portion 110b via the second feed line 140b. The antenna gain can be improved by a structure where the first radiating portion 110a is connected to the first feed line 140a and the second radiating portion 110b is connected to the second feed line 140b.

In the antenna illustrated in FIG. 2B, the first feed line 140a is connected to the first radiating portion 110a from a downward direction and the second feed line 140b is connected to the second radiating portion 110b from an upper direction. On the other hand, in the antenna illustrated in FIG. 2C, the first feed line 140a is connected to the first radiating portion 110a from the downward direction and the second feed line 140b is connected to the second radiating portion 110b from the downward direction. Therefore, the phases of the signals supplied from the first feed line 140a and the second feed line 140b are different in the antenna illustrated in FIG. 2B and in phase in the antenna illustrated in FIG. 2C. In this manner, signals are supplied, in such a manner that the beam radiated from the radiation-side opening portion of the first horn 200a through the first dielectric lens 300a can be synthesized so that the gain is maximized in the front direction (direction perpendicular to the radiation-side opening portion). The maximum direction of the gain of the radiated beam can be set in an arbitrary direction by controlling the phases of the signals supplied from the first feed line 140a and the second feed line 140b.

Example 3

FIGS. 3A, 3B, and 4 are structural diagrams of a flat beam generating array antenna according to an example of the invention. FIGS. 3A and 3B illustrate shapes as viewed from the radiation-side opening portion side of the first horn 200a. Example 3 is different from the examples described above in the horn shape.

In the antenna illustrated in FIG. 3A, the shape of the radiation-side opening portion of the first horn 200a is formed such that the direction of the first imaginary line A1-A1' is longer than the direction of the third imaginary line C1-C1' and four corners are formed in a curved shape (rounded-corner rectangle shape).

Further, in the antenna illustrated in FIG. 3B, the shape of the radiation-side opening portion of the first horn 200a is formed into an elliptical shape in which a long side in the direction of the first imaginary line A1-A1' is longer than a short side in the direction of the third imaginary line C1-C1'.

The shape of the radiation-side opening portion of the first horn 200a of the antenna of the invention may be selected from either a rectangular shape illustrated in FIG. 1 or a shape including a curved portion illustrated in FIG. 3A or 3B in accordance with ease of manufacturing and a radiation pattern of the flat beam to be generated. Also, in accordance with the radiation pattern of the flat beam to be generated, it may be in a shape of a horn having a ridge at the radiation-side opening portion or the radiation-source-side opening portion.

In the antenna illustrated in FIG. 4, a side surface shape of a second horn 200b has a curved shape. The other points are the same as those of the antennas of the examples described above. Further, the side surface shape of the horn of the antenna of the invention may be a shape other than a linear shape (FIG. 1) like the first horn 200a or a curved shape (FIG. 4) like the second horn 200b (for example, a shape with irregularities). Even when the shape is selected in accordance with the radiation pattern of the flat beam to be generated, the effects of the flat beam generating array antennas of the invention are the same.

Example 4

FIG. 5 is a structural diagram of a flat beam generating array antenna according to an example of the invention. The flat beam generating array antenna of Example 4 includes an electromagnetic wave shielding portion instead of a horn. (A) of FIG. 5 illustrates a shape of the antenna of the example as seen from the radiation-side opening portion side. (B) of FIG. 5 illustrates a cross-sectional shape of the antenna of the example along the first imaginary line A1-A1'. (C) of FIG. 5 illustrates a cross-sectional shape of the antenna of the example along the third imaginary line C1-C1'.

The antenna illustrated in FIG. 5 includes a first electromagnetic wave shielding portion 210a and a second electromagnetic wave shielding portion 210b. The first electromagnetic wave shielding portion 210a includes a first opening portion having the same shape as the radiation-side opening portion of the first horn 200a and the first dielectric lens 300a is arranged in the first opening portion. The second electromagnetic wave shielding portion 210b is arranged in between the first radiating portion 110a, the second radiating portion 110b, and the first dielectric lens 300a, in a direction parallel to the second imaginary line B1-B1'. In the example, the cross-sectional shape of the second electromagnetic wave shielding portion 210b in a case of cutting with a plane parallel to the direction of the first imaginary line A1-A1' is a triangle. However, other shapes may be used.

Structures other than those described above are the same as those in Examples 1 to 3.

The electromagnetic waves radiated from the first radiating portion 110a and the second radiating portion 110b are converted from the spherical wave to the plane wave by the first dielectric lens 300a and radiated from opening surfaces of the first dielectric lenses 300a on a side opposite to the first radiating portion 110a and the second radiating portion 110b. In the antenna of the example, the radiation of electromagnetic waves is limited by the shape of the first opening portion of the first electromagnetic wave shielding portion 210a. In other words, the shape of an electromagnetic wave to be radiated, that is, the beam, is a flat beam of which the width in the direction of the first imaginary line A1-A1' is narrower than the width in the direction of the second imaginary line B1-B1'.

Since a horn is unnecessary for the antenna of the example, the structure can be simplified and the cost can be reduced.

Also, the electromagnetic waves radiated from the first radiating portion 110a pass a path along the first optical axis D1a-D1a' by arranging the second electromagnetic wave shielding portion 210b as described above and the electromagnetic wave radiated from the second radiating portion 110b passes a path along the second optical axis D1b-D1b'. That is, electromagnetic waves radiated from mutually different optical axes are shielded with the second electromagnetic wave shielding portion 210b, in such a manner that it is possible to reduce side lobes of electromagnetic waves, that is, beams, radiated through the first dielectric lens 300a.

Example 5

FIG. 6 is a block diagram of a transmitting side of a sensor including the flat beam generating array antenna according to Examples 1 to 4 described above. In Example 5, an example of the transmitting side of the sensor including the flat beam generating array antenna will be described.

A sensor illustrated in FIG. 6 includes a flat beam generating array antenna 10 and a first transmission circuit 510a. The first transmission circuit 510a includes a first terminal 511a connected to the first radiating portion 110a and a second terminal 512a connected to the second radiating portion 110b. The phases of the signals output from the first terminal 511a and the second terminal 512a are determined by a direction of an electric field plane generated in the first radiating portion 110a and the second radiating portion 110b and may be differential or same.

Next, the operation of a transmitting unit of the sensor of the example will be described. The signal output from the first terminal 511a of the first transmission circuit 510a is input to the first radiating portion 110a and radiated from the first dielectric lens 300a as an electromagnetic wave. Similarly, the signal output from the second terminal 512a of the first transmission circuit 510a is input to the second radiating portion 110b and radiated from the first dielectric lens 300a as an electromagnetic wave.

The transmitting unit of the sensor including the flat beam generating array antenna of the example can be applied to a sensor for measuring a distance to an obstacle or the like, and a relative speed of an obstacle or the like.

Example 6

FIG. 7 is a block diagram of a transmitting side of a sensor having the flat beam generating array antenna according to Examples 1 to 4 described above. In Example 6, an example of the transmitting side of the sensor in which electricity is supplied to the flat beam generating array antenna via a distributer will be described.

The sensor illustrated in FIG. 7 includes the flat beam generating array antenna 10, a second transmission circuit 510b, and a first distributer 500a. The second transmission circuit 510b includes a third output terminal 513a for outputting a signal. The first distributer 500a includes a first terminal 501a, a second terminal 502a, and a third terminal 503a.

The third terminal 503a of the first distributer 500a is connected to the third output terminal 513a of the second transmission circuit 510b, the first radiating portion 110a is connected to the first terminal 501a of the first distributer 500a, and the second radiating portion 110b is connected to the second terminal 502a of the first distributer 500a. The phases of the signals output from the first terminal 501a and the second terminal 502a are determined by the direction of the electric field plane generated in the first radiating portion 110a and the second radiating portion 110b and may be differential or same.

Next, the operation of a transmitting unit of the sensor of the example will be described. The signals output from the third output terminal 513a of the second transmission circuit 510b are input to the third terminal 503a of the first distributer 500a, adjusted to the desired phase and amplitude at the first distributer 500a, and output from the first terminal 501a and the second terminal 502a. The signal output from the first terminal 501a is input to the first radiating portion 110a and radiated from the first dielectric lens 300a as an electromagnetic wave. Similarly, the signal output from the second terminal 502a is input to the second radiating portion 110b and radiated from the first dielectric lens 300a as an electromagnetic wave.

The transmitting unit of the sensor including the flat beam generating array antenna of the example can be applied to a sensor for measuring a distance to an obstacle or the like, and a relative speed of an obstacle or the like.

Example 7

FIG. 8 is a block diagram of a receiving side of a sensor including the flat beam generating array antenna according to Examples 1 to 4 described above. In Example 7, an example of the receiving side of the sensor including the flat beam generating array antenna will be described.

The sensor illustrated in FIG. 8 includes the flat beam generating array antenna 10, a first reception circuit 520a, and a second reception circuit 520b. The first reception circuit 520a includes a first input terminal 521a connected to the first radiating portion 110a and the second reception circuit 520b includes a second input terminal 521b connected to the second radiating portion 110b.

Next, the operation of a receiving unit of the sensor of the example will be described. The electromagnetic wave input to the first dielectric lens 300a is converted into an electrical signal at the first radiating portion 110a via the first dielectric lens 300a, and input to the first input terminal 521a of the first reception circuit 520a. Simultaneously, the electromagnetic wave input to the first dielectric lens 300a is converted into an electrical signal at the second radiating portion 110b via the first dielectric lens 300a, and input to the second input terminal 521b of the first reception circuit 520a.

The receiving unit of the sensor including the flat beam generating array antenna of the example can be applied to a sensor for measuring a distance to an obstacle or the like, and a relative speed of an obstacle or the like. Further, since the flat beam generating array antenna of the invention generates a flat beam of which a beam width in the longitudinal direction is longer than that in the transverse direction as described above, it can be applied to a sensor which measures a vertical position (angle from a horizontal plane) of an obstacle or the like in a vertical direction (direction of the first imaginary line A1-A1' (not illustrated in FIG. 8)).

Example 8

FIG. 9 is a block diagram of a sensor including the flat beam generating array antenna according to the Examples 1 to 4 described above. In Example 8, an example of a sensor in which a transmission unit and a receiving unit are connected to the flat beam generating array antenna via a distributer will be described.

The sensor illustrated in FIG. 9 includes the flat beam generating array antenna 10, the second transmission circuit 510b, a third reception circuit 520c, and a second distributer 500b. The second transmission circuit 510b includes the third output terminal 513a for outputting a signal. The second distributer 500b includes a first terminal 501b, a second terminal 502b, a third terminal 503b, and a fourth terminal 504b. The second distributer 500b synthesizes the signals input to the first terminal 501b and the second terminal 502b, and outputs the signals from the third terminal 503b. The second distributor 500b distributes the signals input to the fourth terminal 504b, and outputs the signals from the first terminal 501b and the second terminal 502b.

The fourth terminal 504b of the second distributer 500b is connected to the third output terminal 513a of the second transmission circuit 510b, the third terminal 503b of the second distributer 500b is connected to a third input terminal 521c of the third reception circuit 520c, the first radiating portion 110a is connected to the first terminal 501b of the second distributer 500b, and the second radiating portion 110b is connected to the second terminal 502b of the second distributer 500b.

Next, the operation of the transmitting unit and the receiving unit of the sensor of the example will be described. The signal output from the third output terminal 513a of the second transmission circuit 510b is input to the fourth terminal 504b of the second distributor 500b and adjusted to the desired phase and amplitude by the second distributor 500*b*, and then the signal is output from the first terminal 501*b* and the second terminal 502*b*. The signal output from the first terminal 501*b* is input to the first radiating portion 110*a*, and radiated from the first dielectric lens 300*a* as an electromagnetic wave. Similarly, the signal output from the second terminal 502*b* is input to the second radiating portion 110*b*, and radiated from the dielectric lens 300*a* as an electromagnetic wave.

Electromagnetic waves radiated from the first dielectric lens 300*a* are reflected by an obstacle or the like. The reflected electromagnetic waves are converted into electric signals at the first radiating portion 110*a* and the second radiating portion 110*b* via the first dielectric lenses 300*a*. Further, the electric signal received at the first radiating portion 110*a* is input to the first terminal 501*b* of the second distributor 500*b*, and the electric signal received at the second radiating portion 110*b* is input to the second terminal 502*b* of the second distributer 500*b*. The second distributor 500*b* adjusts the input signal to a desired phase and amplitude, outputs the signal from the third terminal 503*b*, and the second distributer 500*b* inputs the signal to the third input terminal 521*c* of the third reception circuit 520*c*.

The transmitting/receiving unit of the sensor including the flat beam generating array antenna of the example can be applied to a sensor for measuring a distance to an obstacle or the like, and a relative speed of an obstacle or the like.

Example 9

FIG. 10 is a structural diagram of a sensor including the flat beam generating array antenna according to the Example 1 to 4 described above. FIGS. 11A to 11C are block diagrams of the sensor of Example 9. In Example 9, an example of a sensor including a transmitting unit, a transmitting antenna, a receiving unit, and a receiving antenna will be described.

(A) of FIG. 10 illustrates a shape of the flat beam generating array antenna of Example 9 as seen from the radiation-side opening portion side of the first horn 200*a*, (B) of FIG. 10 illustrates a cross-sectional shape of the flat beam generating antenna of Example 9 taken along a sixth imaginary line C2-C2', (C) of FIG. 10 illustrates a cross-sectional shape of the flat beam generating antenna of Example 9 taken along a first imaginary line A1-A1', and (D) of FIG. 10 illustrates a shape of the dielectric substrate 100 as seen from the first surface side.

The first radiating portion 110*a*, the second radiating portion 110*b*, a third radiating portion 110*c*, a fourth radiating portion 110*d*, a fifth radiating portion 110*e*, and a sixth radiating portion 110*f* are arranged on the first surface (surface on which horns 200*a*, 200*b*, and 200*c* are arranged) of the dielectric substrate 100. Each of the radiating portions 110*a* to 110*f* is connected to a semiconductor element 600*a* mounted on the first surface of the dielectric substrate 100 via feed lines 140*a* to 140*f*.

The semiconductor element 600*a* includes the first transmission circuit 510*a*, the first reception circuit 520*a*, the second reception circuit 520*b*, a fourth reception circuit 520*d*, and a fifth reception circuit 520*e*. The semiconductor element 600*a* may be disposed in a gap portion between the first horn 200*a*, the second horn 200*b*, and the dielectric substrate 100. The semiconductor element 600*a* may be mounted on a second surface of the dielectric substrate 100. Further, two or more semiconductor elements 600*a* may be mounted on one or both of the first surface and the second surface of the dielectric substrate 100.

On the first surface of the dielectric substrate 100, the first horn 200*a*, the second horn 200*b*, and the third horn 200*c* are installed. The first to third horns 200*a* to 200*c* may be connected as the same member or may be integrally formed.

In radiation-side opening portions of the horns 200*a* to 200*c*, dielectric lenses 300*a* to 300*c* having a cylindrical shape are respectively installed. The first to third dielectric lenses 300*a* to 300*c* may be connected as the same member or may be integrally formed.

The first radiating portion 110*a* and the second radiating portion 110*b* are respectively disposed in each of two radiation-source-side opening portions of the first horns 200*a*, and connected to the semiconductor element 600*a* by the first conductor portion 120*a* and a second conductor portion 120*b*. The third radiating portion 110*c* and the fourth radiating portion 110*d* are respectively disposed in each of two radiation-source-side opening portions of the second horns 200*b*, and connected to the semiconductor element 600*a* by a third conductor portion 120*c* and a fourth conductor portion 120*d*. The fifth radiating portion 110*d* and the sixth radiating portion 110*f* are respectively disposed in each of two radiation-source-side opening portions of the third horns 200*c*, and connected to the semiconductor element 600*a* by a fifth conductor portion 120*e* and a sixth conductor portion 120*f*.

The transmitting-side antenna and the receiving-side antenna may have the same size and shape. However, it is preferable for the aspect ratio of the receiving-side antenna be set larger.

As illustrated in FIG. 11A, the first transmission circuit 510*a* includes the first terminal 511*a* connected to the first radiating portion 110*a* and the second terminal 512*a* connected to the second radiating portion 110*b*. The phases of the signals output from the first terminal 511*a* and the second terminal 512*a* are determined by the direction of electric field planes generated in the first radiating portion 110*a* and the second radiating portion 110*b* and may be differential or same.

As illustrated in FIG. 11B, the first reception circuit 520*a* includes the first input terminal 521*a* connected to the third radiating portion 110*c* and the second reception circuit 520*b* includes the second input terminal 521*b* connected to the fourth radiating portion 110*d*.

As illustrated in FIG. 11C, the fourth reception circuit 520*d* includes a fourth input terminal 521*d* connected to the fifth radiating portion 110*e* and the fifth reception circuit 520*e* includes a fifth input terminal 521*e* connected to the sixth radiating portion 110*f*.

Next, the operation of the transmitting unit and the receiving unit of the sensor of the example will be described. The signal output from the first terminal 511*a* of the first transmission circuit 510*a* is input to the first radiating portion 110*a* and radiated from the first dielectric lens 300*a* as an electromagnetic wave. Similarly, the signal output from the second terminal 512*a* of the first transmission circuit 510*a* is input to the second radiating portion 110*b* and radiated from the first dielectric lens 300*a* as an electromagnetic wave.

Electromagnetic waves radiated from the first dielectric lenses 300*a* are reflected by an obstacle or the like. The reflected electromagnetic wave is converted into an electrical signal at the third radiating portion 110*c* via the second dielectric lens 300*b*, and input to the first input terminal 521*a* of the first reception circuit 520*a*. Simultaneously, the electromagnetic wave input to the first dielectric lens 300*a* is converted into an electric signal at the fourth radiating portion 110*d* via the second dielectric lens 300*b*, and input to the second input terminal 521*b* of the second reception circuit 520*b*.

Further, the reflected electromagnetic wave is converted into an electric signal at the fifth radiating portion 110e via the third dielectric lens 300c, and input to the fourth input terminal 521d of the fourth reception circuit 520d. Simultaneously, the electromagnetic wave input to the third dielectric lens 300c is converted into an electric signal at the sixth radiating portion 110f via the third dielectric lens 300c, and input to the fifth input terminal 521e of the fifth reception circuit 520e.

The transmitting/receiving unit of the sensor including the flat beam generating array antenna of the example can be applied to a sensor for measuring a distance to an obstacle or the like, and a relative speed of an obstacle or the like. Further, in the flat beam generating array antenna of the invention, a plurality of radiation-side opening portions are arranged side by side in an up-down direction and a right-left direction, and thus it can be applied to a sensor which measures an up-down position (angle from a horizontal plane) of an obstacle or the like in the up-down direction (direction of the first imaginary line A1-A1') and a right-left position (angle from the front direction) of an obstacle or the like in the right-left direction (direction of the sixth imaginary line C2-C2').

Example 10

FIG. 12 is a block diagram of another example of a sensor including the flat beam generating array antenna according to Example 9. In Example 10, an example of a sensor including a signal processing circuit 700 will be described.

The signal processing circuit 700 is connected to the first transmission circuit 510a, the first reception circuit 520a, the second reception circuit 520b, the fourth reception circuit 520d, and the fifth reception circuit 520e. The signal processing circuit 700 supplies a signal to be transmitted from the antenna to the first transmission circuit 510a, and processes the signals output from the first reception circuit 520a, the second reception circuit 520b, the fourth reception circuit 520d, and the fifth reception circuit 520e.

Next, the operation of the transmitting unit and the receiving unit of the sensor of the example will be described. A first transmission signal output from the signal processing circuit 700 and input to the first transmission circuit 510a is output from the first terminal 511a of the first transmission circuit 510a as the second transmission signal, and further input to the first radiating portion 110a and radiated from the first dielectric lens 300a as a transmission electromagnetic wave. Similarly, the second transmission signal output from the second terminal 512a of the first transmission circuit 510a is input to the second radiating portion 110b and radiated from the first dielectric lens 300a as a transmission electromagnetic wave.

Transmission electromagnetic waves radiated from the first dielectric lens 300a are reflected by an obstacle or the like. The reflected electromagnetic wave is converted into a first reception signal at the third radiating portion 110c via a second dielectric lens 300b, and further it is input to the first input terminal 521a of the first reception circuit 520a. The first reception signal is output from the first reception circuit 520a as the fifth reception signal and input to the signal processing circuit 700.

Simultaneously, the reflected electromagnetic wave is converted into the second reception signal at the fourth radiating portion 110d via the second dielectric lens 300b, and further it is input to the second input terminal 521b of the second reception circuit 520b. The second reception signal is output from the second reception circuit 520b as a sixth reception signal and input to the signal processing circuit 700.

Simultaneously, the reflected electromagnetic wave is converted into a third reception signal at the fifth radiating portion 110e via the third dielectric lens 300c, and further it is input to the fourth input terminal 521d of the fourth reception circuit 520d. The third reception signal is output from the fourth reception circuit 520d as a seventh reception signal and input to the signal processing circuit 700.

Simultaneously, the reflected electromagnetic wave is converted into a fourth reception signal at the sixth radiating portion 110f via the third dielectric lens 300c, and further it is input to the fifth input terminal 521e of the fifth reception circuit 520e. The fourth reception signal is output from the fifth reception circuit 520e as the eighth reception signal and input to the signal processing circuit 700.

The signal processing circuit 700 combines and processes the signals output from the first reception circuit 520a, the second reception circuit 520b, the fourth reception circuit 520d, and the fifth reception circuit 520e. In other words, the sensor of the example includes one transmission channel and four reception channel, and combines and processes signals of four channels.

The transmitting/receiving unit of the sensor including the flat beam generating array antenna of the example can be applied to a sensor for measuring a distance to an obstacle or the like, and a relative speed of an obstacle or the like. Further, the flat beam generating array antenna of the invention can be applied to a sensor which measures an up-down position (angle from a horizontal plane) of an obstacle or the like in the up-down direction (direction of the first imaginary line A1-A1') and a right-left position (angle from the front direction) of an obstacle or the like in the right-left direction (direction of the sixth imaginary line C2-C2').

Example 11

FIG. 13 is a block diagram of an example of an in-vehicle system including the sensor including the flat beam generating array antenna according to Example 11.

The in-vehicle system of Example 11 includes the flat beam generating array antennas of Example 1 to 4, the first transmission circuit 510a, the first reception circuit 520a, the second reception circuit 520b, the fourth reception circuit 520d, the fifth reception circuit 520e, the signal processing circuit 700, and a vehicle control circuit 800.

The signal processing circuit 700 is connected to the first transmission circuit 510a, the first reception circuit 520a, the second reception circuit 520b, the fourth reception circuit 520d, and the fifth reception circuit 520e. The signal processing circuit 700 supplies a signal to be transmitted from the antenna to the first transmission circuit 510a, and processes the signals output from the first reception circuit 520a, the second reception circuit 520b, the fourth reception circuit 520d, and the fifth reception circuit 520e.

The vehicle control circuit 800 is connected to the signal processing circuit 700. The connection between the vehicle control circuit 800 and the signal processing circuit 700 may be wired by cable or wireless such as wireless Local Access Network (LAN).

The vehicle control circuit 800 has a function of controlling the operation of a moving body such as a power train control and a vehicle body control according to the signal output from the signal processing circuit 700.

The operation of the sensor including the flat beam generating array antenna of the example is the same as that of Example 10. The vehicle control circuit 800 recognizes the position of an obstacle or the like, and the distance to an obstacle or the like by the signal output from the signal processing circuit 700 and outputs a control signal to a power train control unit or a vehicle body control unit, in such a manner that the movement of a moving body according to the surrounding situation is controllable. Thus, the in-vehicle system of the example functions as a driving support system.

Example 12

FIG. 14 is a diagram illustrating an attachment angle of the flat beam generating array antenna of Examples 9 and 10 described above. In Examples 12 and 13, variations of the attachment angle of the antenna will be described.

In Example 12, an antenna (radiation-side opening portion) is arranged such that the first imaginary line A1-A1', a fourth imaginary line A2-A2', and a fifth imaginary line A3-A3' become the vertical direction and a seventh imaginary line E1-E1' passing the center of the first imaginary line A1-A1', the center of the fourth imaginary line A2-A2', and the center of the fifth imaginary line A3-A3' becomes the horizontal direction.

The vertical (direction along the first imaginary line A1-A1', the fourth imaginary line A2-A2', and the fifth imaginary line A3-A3') length of the radiation-side opening portion of each antenna is wider than the horizontal (direction along the seventh imaginary line E1-E1') width thereof. Therefore, in the cross-sectional shape perpendicular to the radiation direction of the beam radiated from the antenna of the example, the direction in the vertical direction is narrow and the horizontal direction is wide. With such an antenna structure, it is possible to realize radar having a wide irradiation angle in the horizontal direction while solving the problem of reducing the load clutter noise.

The sensor including the antenna of Example 12 can be attached to either the front side, the lateral side, or the rear side of a moving body.

Example 13

FIG. 15 is a view illustrating an attachment angle of the sensor including the flat beam generating array antenna of Example 9 and 10 described above to a moving body. In Example 13, an example in which a long side of an opening portion of the antenna is inclined from the vertical direction will be described.

In Example 13, as illustrated in FIG. 15, an antenna (radiation-side opening portion) is arranged in a state where the first imaginary line A1-A1' and the seventh imaginary line E1-E1' (horizontal direction) form a polarization angle 50*a*. An angle formed by the fourth imaginary line A2-A2' and the seventh imaginary line E1-E1' and an angle formed by the fifth imaginary line A3-A3' and the seventh imaginary line E1-E1' are also the polarization angle 50*a*. It is preferable that the polarization angle 50*a* is 45°. Since the beam radiated from the antenna of the Example 13 has a polarization angle of 45° with respect to the vertical direction, the influence of the load clutter noise can be reduced.

Further, the sensor including the antenna of Example 13 can be attached to either the front side, the lateral side, or the rear side of the moving body.

Hereinbefore, the preferred modes of the structure and the operation of the flat beam generating array antenna, the sensor including the flat beam generating array antenna, and the in-vehicle system including the sensor of the invention are described using the Examples 1 to 13. The number of radiating portions constituting the flat beam generating array antenna of the invention may be different from those of Examples 1 to 13 and the effect of the flat beam generating array antenna of the invention can be obtained. Furthermore, even when the shape of the radiating portion is different from those of Examples 1 to 13, when the longitudinal direction of one radiation side opening portion is longer than the transverse direction, the effect of the flat beam generating array antenna of the invention can be obtained.

Further, in Examples 1 to 13, the first to third dielectric lenses 300*a* to 300*c* have convex shapes bulging in the direction of the first to six radiating portions 110*a* to 110*f*. However, the first to third dielectric lenses 300*a* to 300*c* may have convex shapes bulging in an opposite direction from the first to sixth radiating portions 110*a* to 110*f*. In addition, the shape of the first to third dielectric lenses 300*a* to 300*c* is not a cylindrical shape but may be a convex surface having a rotating dipole shape.

Further, the types and the number of combinations of the flat beam generating array antenna and the sensor including the flat beam generating array antenna may have arbitrary combinations other than those of the examples described above.

Further, the attachment angle of the sensor including the flat beam generating antenna to the moving body and the direction of the beam radiated from the flat beam generating antenna may have arbitrary forms other than those of Examples 12 and 13.

Also, the material constituting the dielectric substrate 100 may be either a resin material, a ceramic material, or a semiconductor material.

As described above, according to the examples of the present invention, there are provided a plurality of radiating portions formed on a substrate, and a plurality of dielectric lenses respectively converting the spherical wave radiated from each radiating portion into the plane wave and the dielectric lens is formed in a shape where the cross-sectional surface perpendicular to the beam radiation direction has a shape in which a beam having the second direction narrower than the first direction perpendicular to the second direction is radiated, and further a plurality of dielectric lenses are arranged side by side in the second direction so that the beams radiated from the respective dielectric lenses are synthesized. Thus, it is possible to reduce the size of the dielectric lenses and shorten the focal length. Therefore, it is possible to reduce the size of the flat beam generating antenna. In particular, a length in a depth direction can be reduced.

In addition, the dielectric lens has a shape in which the second direction is longer than the first direction and the dielectric lens is installed so that the first direction becomes a horizontal direction and the second direction becomes a vertical direction. Therefore, the dielectric lens can generate a flat beam with a wide horizontal width.

Furthermore, a plurality of waveguides (horns) propagating radio waves radiated from the radiating portions are provided, and each dielectric lenses are installed in the radiation-side opening portions (opening portions on the opposite side to the radiating portions) of the respective waveguides. Therefore, the gain of the antenna can be improved.

In addition, since the shape of the radiation-side opening portion of the waveguide includes at least four straight sides, it is possible to increase the opening area and improve the gain of the antenna.

In addition, a reference potential portion formed around the radiating portion on the substrate and serving as a reference potential of the radiating portion is provided and the reference potential portion is electrically connected to the waveguide. Therefore, the reflection at the entrance of the horn can be reduced, and thus the gain can be improved by reducing the loss of the antenna.

Further, since the dielectric lens is formed in a convex shape having a thick central portion and a thin peripheral portion, the gain of the antenna can be improved.

In addition, since the dielectric lens is a cylindrical lens having a hyperbolic shape in which the thickness in the first direction (horizontal direction) is constant and the center portion in the second direction (vertical direction) is thick, the gain of the antenna can be improved. In particular, by using the horn and the cylindrical lens together, electromagnetic waves converted into plane waves by the horn will enter the surface of the cylindrical lens, so that a flat beam with reduced beam disturbance can be generated.

In addition, since the plurality of radiating portions and the plurality of dielectric lenses are arranged side by side in the up-down direction and the right-left direction, obstacles can be detected from the horizontal direction and the vertical direction. For example, it is possible to detect an uphill slope ahead and obstacles separately.

The invention is not limited to the examples described above and includes various modification examples and equivalent structures within the scope of the appended claims. For example, the examples described above are described in detail in order to explain the invention in an easy-to-understand manner and the invention is not necessarily limited to those including all the configurations described. In addition, apart of the configuration of one example may be replaced by the configuration of another example. Further, the configuration of one embodiment may be added to the configuration of another embodiment. In addition, other configurations may be added, deleted, or replaced with respect to a part of the configuration of each example.

The configurations, functions, processing units, processing means, and the like described above may be realized by hardware, for example, by designing a part or all of them with an integrated circuit or the like, or realized by software by a processor interpreting and executing a program realizing the respective functions.

Information such as programs, tables, files, and the like which realize the respective functions can be stored in a storage device such as a memory, a hard disk, and a solid state drive (SSD), or a recording medium such as an IC card, an SD card, and a DVD.

Further, control lines and information lines which are considered necessary for the explanation are illustrated and not all control lines and information lines necessary for mounting are illustrated. In fact, it can be thought that almost all configurations are interconnected.

The invention claimed is:

1. An array of horn antenna comprising:
   a plurality of radiating portions which are formed on a substrate and radiate a spherical wave;
   a plurality of dielectric lenses, wherein
      the shape of a cross section of each dielectric lens perpendicular to a radiation direction of a beam is formed in a shape which radiates a beam which is narrower in a second direction than in a first direction orthogonal to the second direction,
      each of the plurality of dielectric lenses convert the spherical wave radiated from each radiating portion into a plane wave in the second direction, and
      the plurality of dielectric lenses are arranged side by side in the second direction so that beams radiated from the respective dielectric lenses are synthesized; and
   a plurality of waveguides for propagating radio waves radiated from the radiating portions, wherein
      each dielectric lens is installed at an opening portion of each waveguide on an opposite side of the radiating portion, and
   wherein the shape of the opening portion of the waveguide on the opposite side of the radiating portion includes at least four or more straight sides.

2. The array of horn antenna according to claim 1, wherein
   the dielectric lens has a shape which is longer in the second direction than in the first direction, and
   the dielectric lens is installed such that the first direction extends along a horizontal direction and the second direction extends along a vertical direction.

3. The array of horn antenna according to claim 1, further comprising:
   a reference potential portion which is formed around the radiating portion on the substrate and serves as a reference potential of the radiating portion, wherein
   the reference potential portion is electrically connected to the waveguide.

4. The array of horn antenna according to claim 1, wherein
   the dielectric lens has a shape of a thick central portion and a thin peripheral portion in a direction in which the beam is radiated.

5. The array of horn antenna according to claim 1, wherein
   the dielectric lens is a cylindrical lens having a hyperbolic shape in which the thickness in the first direction is constant and a central portion is thick in the second direction, and converting the spherical wave being passed through the dielectric lens into the plane wave in the second direction.

6. The array of horn antenna according to claim 1, wherein
   the plurality of radiating portions and the plurality of dielectric lenses are arranged side by side in an up-down direction and a right-left direction.

7. A sensor including the array of horn antenna according to claim 1, comprising:
   one or more transmission circuits connected to the radiating portions.

8. A sensor including the array of horn antenna according to claim 1, comprising:
   one or more reception circuits connected to the radiating portions.

9. A sensor including the array of horn antenna according to claim 1, comprising:
   transmission circuits; and
   reception circuits, wherein
      the transmission circuits are connected to a first group comprising one or more of the plurality of radiating portions, and
      the reception circuits are respectively connected to a second group comprising one or more of the plurality of radiating portions.

10. The sensor according to claim 9, further comprising:
a signal processing circuit which is connected to the transmission circuits and the reception circuits.

11. An in-vehicle system including the sensor according to claim 10, comprising:
a vehicle control circuit which is connected to the signal processing circuit.

* * * * *